April 2, 1940.                J. M. MITCHELL                2,196,119
                            DEWATERING APPARATUS
                            Filed June 8, 1937            3 Sheets-Sheet 1
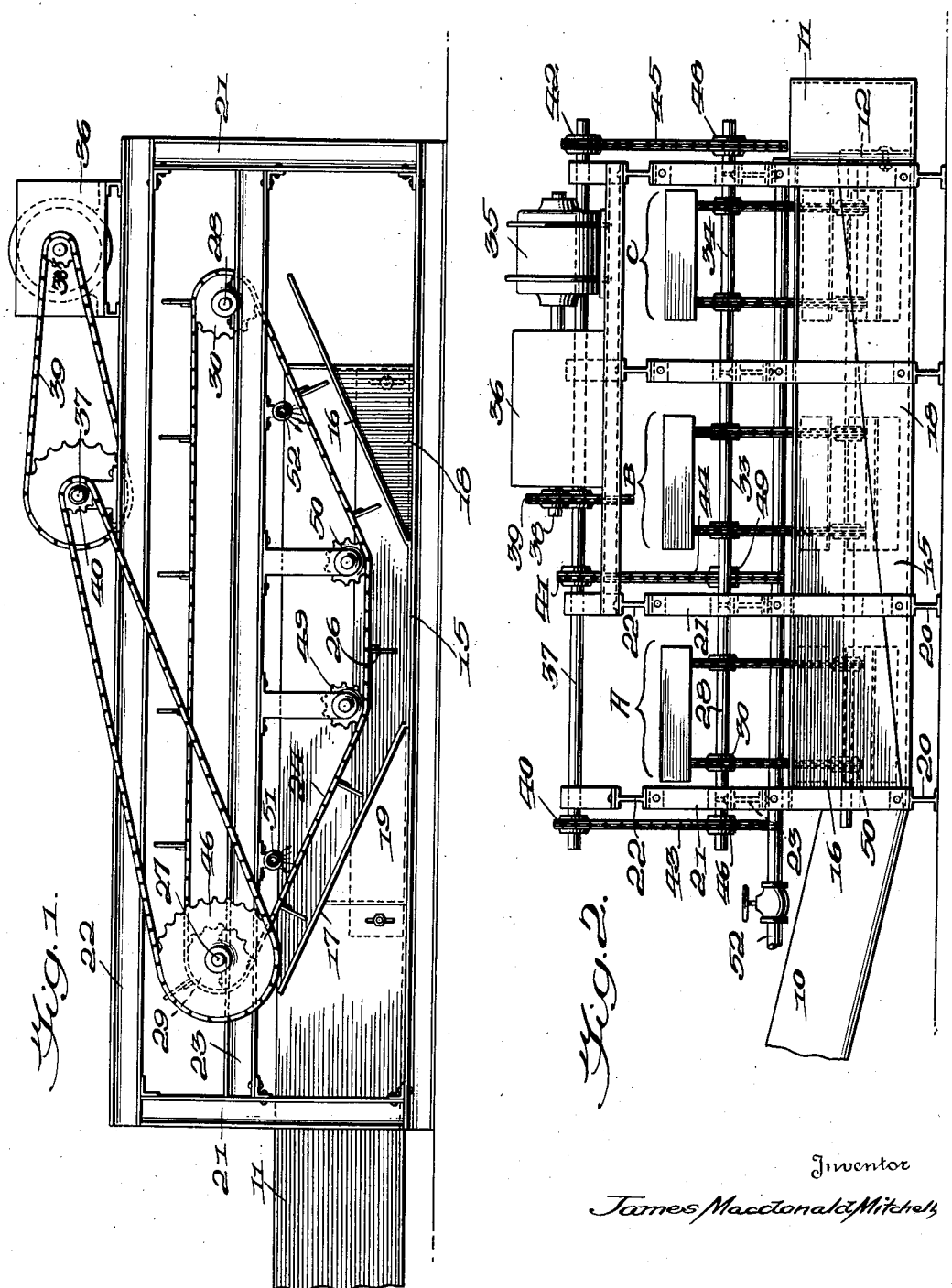
Inventor
James Macdonald Mitchell
By Edmund H. Parry Jr.
Attorney

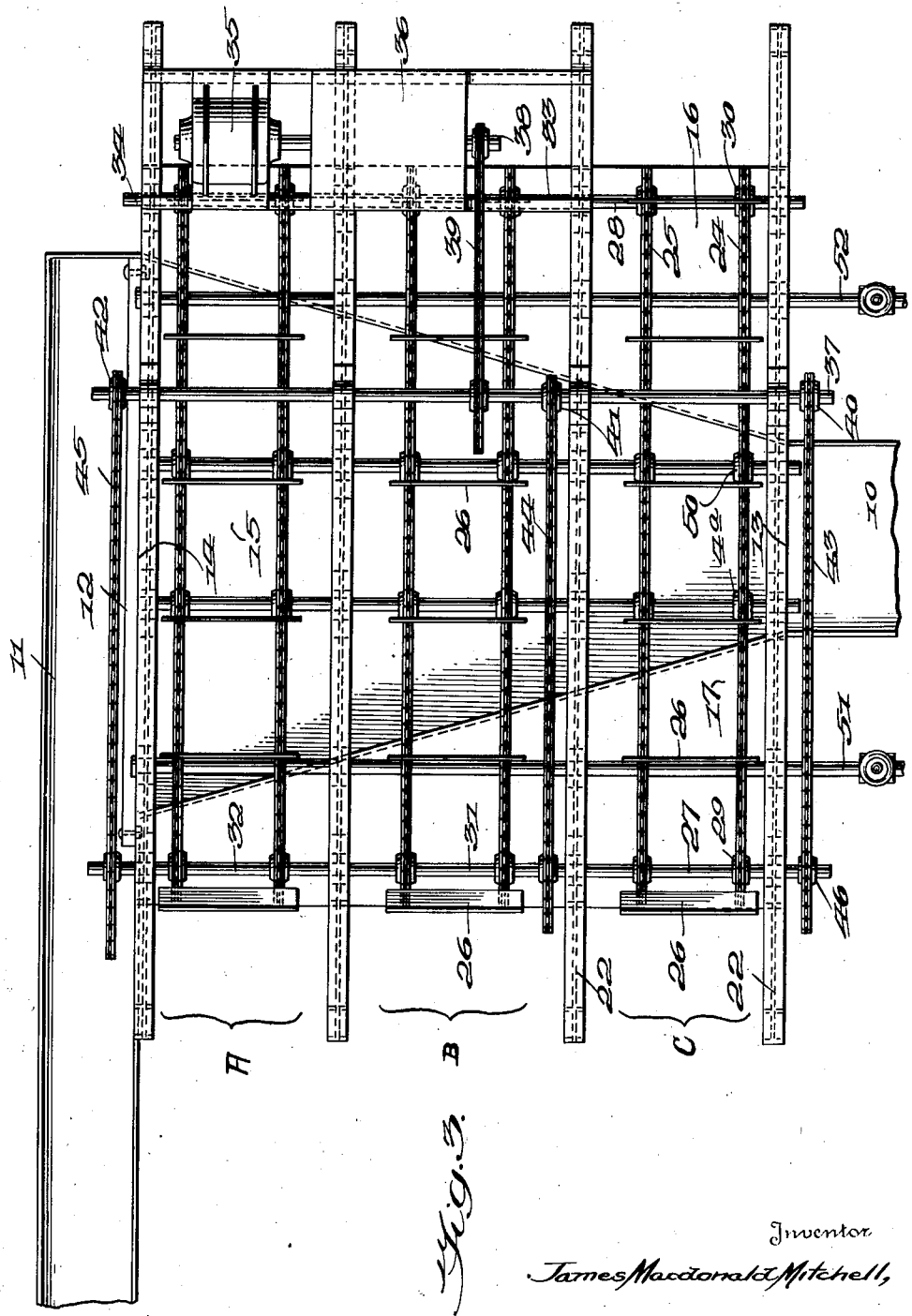

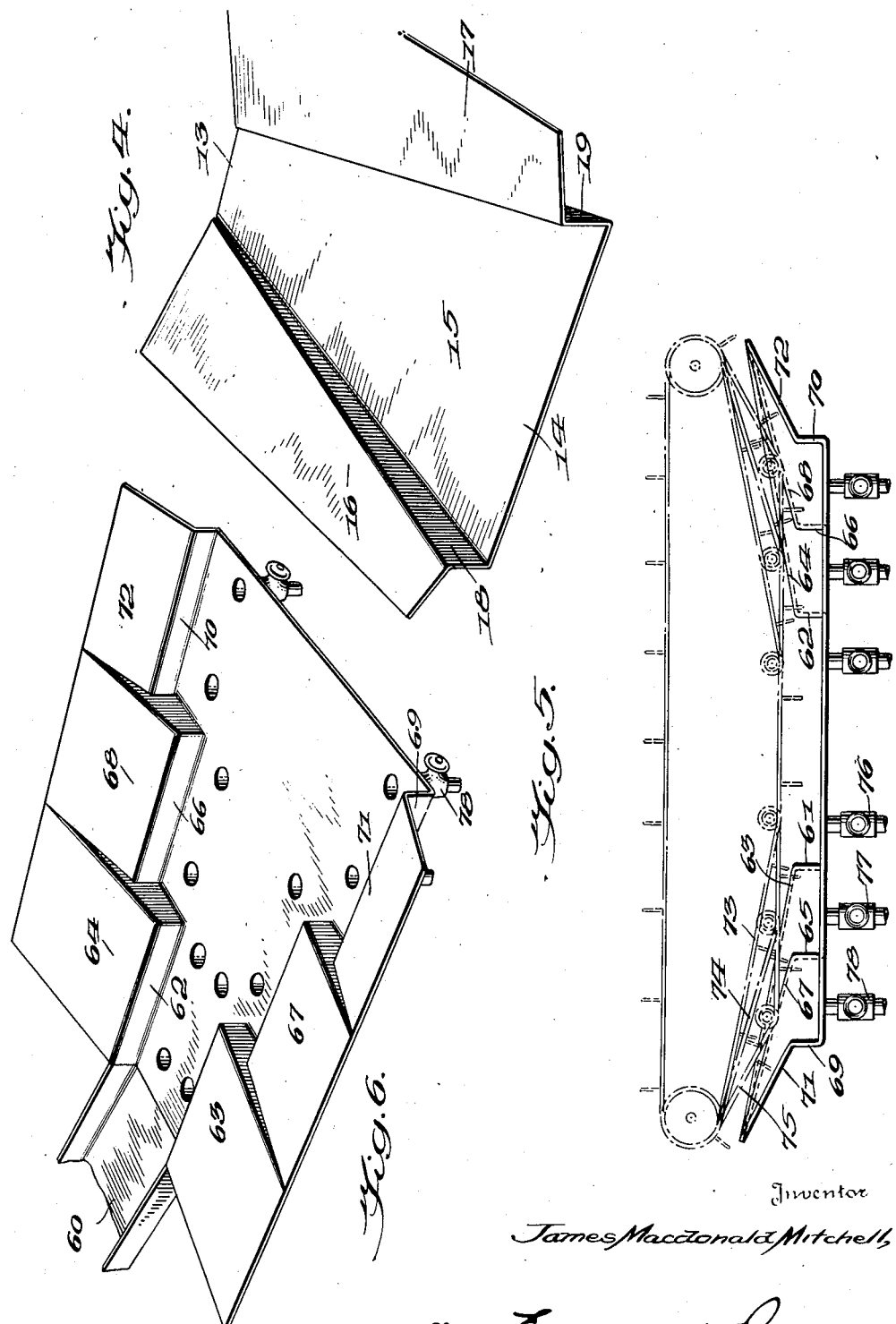

Patented Apr. 2, 1940

2,196,119

UNITED STATES PATENT OFFICE 2,196,119

DEWATERING APPARATUS

James Macdonald Mitchell, Old Lyme, Conn.

Application June 8, 1937, Serial No. 147,092

6 Claims. (Cl. 209—156)

This invention is directed to a dewatering apparatus for removing solids from liquids. According to the invention solids may rapidly be settled and withdrawn from liquids in a continuous operation, and arrangement is made whereby different grades of material are classified in the settling stage so that the coarser and finer grades may be removed separately.

The proposed apparatus enables solids to be settled out of a liquid during the course of flow through the apparatus. Withdrawal of the settled solids is effected in a direction angular to and generally cross-current of the flow of liquid. In order to effect classification of the materials, arrangement is made whereby the flow of liquid diminishes. The decrease in the flow velocity of the liquid together with the fact that the settling rate of solids is directly proportional to the size of the particles causes different grades of materials to be settled in progressive portions of the apparatus, the coarsest material settling first and the finest materials settling last.

The main and collateral features of the invention together with the principles of operation may be understood by reference to the following detailed description of the embodiments of the invention illustrated in the drawings.

In such drawings:

Fig. 1 is an elevation of one form of apparatus constructed in accordance with the invention and taken at the inlet end;

Fig. 2 is a side elevation of the same apparatus;

Fig. 3 is a top plan view;

Fig. 4 is a perspective view illustrating the shape of the trough shown in Figs. 1 through 3;

Fig. 5 is an end elevation, partially diagrammatic, of a further form of apparatus; and, Fig. 6 is a perspective view illustrating the form of trough used in the apparatus of Fig. 5.

Referring to the embodiment of Figs. 1 through 4, the liquid containing the solids to be settled enters through an inlet 10. Such inlet empties into a trough of special design, and after depositing the solid materials therein during the course of flow the liquid passes out and is discharged through an overflow launder 11. An adjustable gate 12 is provided at the outlet end of the trough which may be adjusted vertically. The adjustment of such gate will regulate the discharge of liquid into the overflow launder, and with the rate of feed to the inlet 10 will determine the flow velocity of liquid through the trough.

The trough through which the liquid flows and in which the solid materials are settled is constructed with a relatively narrow inlet end 13 and a substantially wider outlet end 14. In its simplest form such trough will increase gradually in cross-section from its inlet end to its outlet. The bottom 15 of the trough will be horizontal, or substantially so, in a longitudinal direction. As shown it has a flat transverse form but this is not entirely necessary.

For purposes of economy and weight, and more particularly to promote the rapid settling of the solid material, the trough is preferably constructed so as to be relatively shallow. Inclined aprons are provided at one or both sides of the trough up which the solid materials settled on the bottom 15 may be withdrawn in a direction cross-current to the flow of liquid through the trough. In the embodiment illustrated opposite side aprons 16 and 17 are shown, meeting the respective short side walls 18 and 19 which extend upwardly from the bottom 15.

Supporting the trough structure just described is a suitable skeleton frame comprising a series of transverse base beams 20, uprights 21 and transverse top beams 22. A further series of transverse beams 23 may also be provided above the trough for purposes hereafter to be explained.

To withdraw the material settled on the bottom of the trough during the course of flow of the liquid suitable mechanical means are provided which will drag the settled material, as soon as the level thereof reaches a suitable height, up one or the other, or both of the side aprons 16 and 17. In the present embodiment I have shown a series of flight conveyors but it should be understood that screw, bucket, or other types of conveyors may also be used within the scope of the invention.

Since by reason of the form of the trough different grades of material will settle in different longitudinal areas thereof between the inlet and overflow ends it is preferable to provide different conveyors for different longitudinal areas of the trough and aprons. As best shown in Fig. 3 I have in the present instance provided three flight conveyors, one adjacent the inlet end where the trough is narrowest for withdrawing the coarsest material, a second in the middle portion of the trough for withdrawing materials of medium grade and a third in the widest portion of the trough adjacent the overflow launder for withdrawing the finest solids. Each of said flight conveyors consists of a pair of spaced chains 24 and 25, carrying a series of spaced blades, or hoes, 26. Supported in suitable bearings on the cross beams 23 adjacent the outer extremities of the aprons 16 and 17 are a pair of shafts 27 and 28 respectively provided with a series of sprockets 29 and 30 by which the pairs of chains of the first flight conveyor A are carried. If all of the conveyors are to be driven at the same speed the shafts 27 and 28 may extend throughout the length of the trough. It is found, however, that more efficient results will be obtained if the conveyors operating in the different areas of the trough are operated at different speeds. Accordingly, shaft 27 is made relatively short and followed by subsequent shaft sections 31 and 32. Shaft 28 is similarly proportioned and followed by shaft sections 33 and 34. Shafts 31 and 33 through their sprockets will support the chains of the second flight conveyor B and shafts 32 and 34 will support the third flight conveyor C. The driving means for the conveyors comprises an electric motor 35 operating through a speed reducing gear box 36. Supported on the cross beams 22 of the frame is a countershaft 37 driven by the output shaft 38 of the gear box by a suitable driving chain or belt 39. Carried by shaft 37 are a series of sprockets or pulley bands 40, 41 and 42 which through driving chains or belts 43, 44 and 45 drive shafts 27, 31 and 32 of the respective flight conveyors A, B and C. The corresponding sprockets or pulley bands 46, 47 and 48 of shafts 27, 31 and 32 may be made of varying size so that the different conveyors may be driven from shaft 37 at different relative speeds. It will be noted, for example, that sprocket 48 is larger than either 46 or 47 so that conveyor C for withdrawing the finest materials operates at a slower speed than either of the other conveyors. In all cases, however, the speed of the conveyors should be relatively slow since the capacity of the trough for settled materials is somewhat limited, and a fast speed of the blades 26, even though in a direction crosswise of the flow of liquid through the trough, might cause undue agitation which would impair the settling of the solid materials.

In order to insure the proper operation of the flight conveyors in relation to the side aprons 16 and 17 it is desirable to provide a series of idler sprockets 49 and 50 in spaced apart relation on opposite sides of the longitudinal axis of the trough. As shown in Fig. 1 such sprockets may be supported through suitable brackets and shafts depending from the cross frame members 23. Such sprockets will serve to properly tension the conveyor chains and cause the conveyor blades 26 to ride up and down the respective aprons 16 and 17. As will be observed from Fig. 1 the arrangement will preferably be such that the conveyor blades operate in an area above the bottom 15 of the trough and in slightly spaced relation to the side aprons.

With the driving arrangement here described it will be understood that the different grades of materials may be carried up and discharged at the outer edge of either of the side aprons 16 or 17. By providing a reverse on the motor or in the gear box the direction of movement of the various conveyors may be reversed at will, and in some instances it may be found desirable to periodically reverse the conveyors so as to alternately discharge first at one side and then at the other. It may also be desirable to drive different of the conveyors A, B and C in different directions at the same time, and this can be accomplished by suitable modification in the driving shafts and driving chains in a manner which will be obvious to a man skilled in the art. As has already been indicated, also, the different conveyors may be driven at different speeds, or they can be driven at the same speed by making sprockets 46, 47 and 48 of the same size.

Before final discharge of the material it will in various instances be found desirable to wash the same. This may be conveniently accomplished with the present apparatus by providing spray pipes 51 and 52 above the aprons from which a spray of water or other liquid may be discharged against the solid material as it is drawn up either of the conveyor aprons by the different conveyors. Through such an arrangement the spray liquid will drain down the apron into the trough and eventually be discharged through the overflow launder. Also, any fine material which may accidentally have been settled with a coarser material will be washed down the apron and be carried by the flow of liquid through the trough and settled in a subsequent area thereof for withdrawal by a later conveyor.

Instead of making the trough of gradually increasing cross-section as illustrated in Fig. 4, the width of the trough from the inlet to the outlet end may be increased in a stepped arrangement as illustrated in Figs. 5 and 6. As before, the trough will be narrow at its intake end adjacent the inlet here designated at 60. Short opposing side walls 61 and 62 extend in parallel relation and extending upwardly and at an angle therefrom are relatively long aprons 63 and 64. In the next section of the trough side walls 65 and 66 are more widely spaced. The adjoining side aprons 67 and 68 will preferably be more steeply inclined than aprons 63 and 64. Adjacent the outlet end the trough is bounded by side walls 69 and 70 from the upper ends of which extend still steeper inclined side aprons 71 and 72.

In Fig. 5 three flight conveyors are diagrammatically illustrated as operating in the three longitudinal areas of the trough. Conveyor 73 operates in association with aprons 63 and 64 in the narrowest area of the trough adjacent the inlet end. Conveyor 74 operates in the intermediate area in association with aprons 67 and 68. Conveyor 75 operates adjacent the outlet end of the trough in connection with aprons 71 and 72. It will be seen that by increasing the incline of the aprons in the successively wider areas of the trough the conveyor blades sweep across a greater distance transversely of the trough before the flight thereof inclines upwardly. If the aprons in each area of the trough were of the same incline, as in the form of the invention first described, the sweep of the conveyor blades across the bottom of the trough would be the same in each instance, regardless of the fact that the trough increases in width from its inlet end to the overflow discharge.

The settling and classifying apparatus embodying the principles of shape herein described may if desired be used without the cross-current conveyor mechanism by providing valves at suitable points of the trough bottom in the different longitudinal areas. For purposes of illustration series of discharge valves 76, 77 and 78 are provided in connection with the form of trough shown in Figs. 5 and 6. Similar valves may be employed in connection with a trough shown in Figs. 1 through 4. It may be desirable to provide such valves in any instance so that in the event of a break-down of one or more of the flight conveyors emergency operation of the apparatus may be continued. Such valves also form a ready means of obtaining complete removal of all settled material from the trough when it is desired to clean the same.

The several principal features of the invention relating to the variation in the form of the trough in the various areas for the purposes of obtaining variation in the flow of liquid and classification in the settling of the solids, and the manner of withdrawing the settled materials in a direction angular to the direction of flow of liquid through the trough may be carried out through apparatus differing in detail from the forms here illustrated. The invention is therefore not to be taken as limited further than required by the accompanying claims.

I claim:

1. A separating apparatus for removing solids from liquids comprising an elongated tank in the form of a relatively shallow continuous trough through which liquid flows from one end to the other in an uninterrupted stream and having an inlet at one end for feeding through the trough a stream of liquid containing the solids to be removed, a liquid discharge at the other end of the trough, said trough including a succession of stepped longitudinal portions, each portion being of greater cross section than but being in open communication with the preceding portion, said trough having a substantially flat bottom wall extending throughout all of said stepped longitudinal portions, and conveyor means in the different portions of the trough for removing from the bottom wall of the trough solids settling out of the liquid stream.

2. A separating apparatus for settling and removing solids from admixture with liquid comprising a trough structure having a continuous uninterrupted bottom and having at one end an inlet for liquid containing solids, and having a liquid outlet at the opposite end, said trough structure increasing substantially in width from its inlet end to the outlet end and forming a relatively shallow uninterrupted channel through which the liquid containing the solids flows at a progressively diminishing velocity in a continuous relatively shallow stream from which the solids settle to the bottom of the trough, and mechanical conveyor means for removing solids settled on the bottom of the narrower and wider portions of the trough, and carrying the solids up out of the liquid stream.

3. A separating apparatus for settling and removing solids from admixture with liquid comprising a trough structure having a continuous uninterrupted bottom and having at one end an inlet for liquid containing solids, and having a liquid outlet at the opposite end, said trough structure increasing substantially in width from its inlet end to the outlet end and forming a relatively shallow uninterrupted channel through which the liquid containing the solids flows at a progressively diminishing velocity in a continuous relatively shallow stream from which the solids settle to the bottom of the trough, an inclined apron extending along the side of the trough, and conveyor means operating crosswise of the bottom of the trough and up the side apron for removing solids settled in the trough.

4. A separating apparatus for settling and removing solids from admixture with liquid comprising a trough structure having a continuous uninterrupted bottom and having at one end an inlet for liquid containing solids, and having a liquid outlet at the opposite end, said trough structure increasing substantially in width from its inlet end to the outlet end and forming a relatively shallow uninterrupted channel through which the liquid containing the solids flows at a progressively diminishing velocity in a continuous relatively shallow stream from which the solids settle to the bottom of the trough, and a series of independently movable mechanical conveyors operating crosswise of the trough in different longitudinal areas thereof to remove solids settling in the narrower and in wider portions of the trough.

5. A separating apparatus for removing solids from liquids comprising an elongated tank in the form of a relatively shallow continuous trough having a continuous uninterrupted bottom through which liquid flows from one end to the other in an uninterrupted stream and having an inlet at one end for feeding through the trough a stream of liquid containing the solids to be removed, a liquid discharge at the other end of the trough, said trough increasing in cross-sectional area between the inlet and said liquid discharge so that the stream flows at a decreasing rate at progressive longitudinal portions of the trough, flow rate control means operative to change the rate of flow of the stream at all longitudinal portions of the trough, and means for withdrawing solids settling in the trough out of the liquid stream.

6. A separating apparatus for removing solids from liquids comprising an elongated tank in the form of a relatively shallow trough having a continuous uninterrupted bottom and having an inlet at one end for feeding through the trough a stream of liquid containing the solids to be removed, a liquid discharge at the other end of the trough, said trough increasing in cross-section between the inlet and said liquid discharge, conveyors operating crosswise of the trough in various longitudinal portions of the trough of different width, and means for driving the conveyors in the narrower and wider portions of the trough at different speeds.

JAMES MACDONALD MITCHELL.